May 4, 1926.

R. M. LOVEJOY

SHOCK ABSORBER

Filed Oct. 9, 1922

1,583,404

Inventor—
 Ralph M. Lovejoy.
By— Heard Smith & Tennant
 Attorneys.

Patented May 4, 1926.

1,583,404

UNITED STATES PATENT OFFICE.

RALPH M. LOVEJOY, OF MEREDITH, NEW HAMPSHIRE.

SHOCK ABSORBER.

Application filed October 9, 1922. Serial No. 593,164.

*To all whom it may concern:*

Be it known that I, RALPH M. LOVEJOY, a citizen of the United States, and resident of Meredith, county of Belknap, State of New Hampshire, have invented an Improvement in Shock Absorbers, of which the following description, in connection with the accompanying drawing, is a specification, like characters on the drawing representing like parts.

This invention relates to improvements in shock absorbers and the general object of the invention is to provide means for producing a more effective cushioning of slight shocks or slow relative movements of the parts of the shock absorber, and to provide a quietly operating relief valve.

A further object of the invention is to provide a novel intake valve mechanism leading to the cylinder which will prevent the sticking of the intake valve.

Other objects and features of the invention will more fully appear from the following description and the accompanying drawing and will be pointed out in the claims.

Preferred embodiments of the invention are illustrated in the accompanying drawing, in which, Fig. 1 is a view, partly in elevation and partly in vertical section, of a shock absorber embodying the invention;

Figure 1:
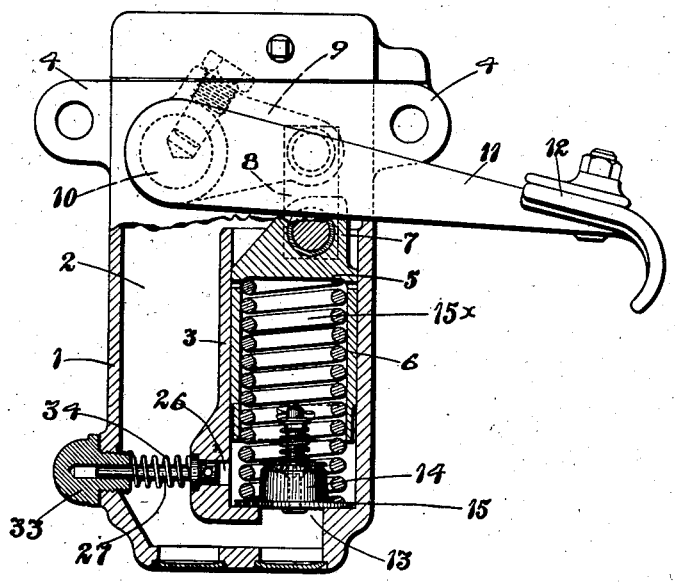

The invention disclosed herein comprises certain improvements upon the construction illustrated in my prior Patent No. 1,324,913 granted December 16, 1919, and my prior application No. 518,120 filed November 28, 1921, and the general purpose of the invention, as above stated, is to provide means for increasing the efficiency of the shock absorber, particularly with reference to cushioning of slight shocks and slow movements of the piston of the shock absorber.

The shock absorber embodying the invention illustrated in the accompanying drawing comprises separate elements adapted to be attached respectively to two relatively movable members, one of said elements comprising a piston and the other a casing presenting a pressure chamber suitably partitioned to provide a compression chamber and an expansion chamber or reservoir with a valve-controlled port for permitting controlled circulation of a fluid within said pressure chamber between the compression and expansion chambers upon relative movement of the casing and piston elements. The preferred embodiment of the invention illustrated herein comprises a casing 1 having a chamber 2 to receive a suitable fluid, such as, oil and a cylinder 3 formed integral with said casing, and preferably enclosed therein. The casing 1 is provided with suitable ears 4 adapted to be secured to one of the relatively movable members whose movement is to be cushioned. A piston which is reciprocably mounted in the cylinder, is connected through suitable mechanism to the other relatively movable member and means provided for permitting free movement of the piston in one direction and a restricted movement of the piston in the other direction to cushion the latter movement.

The invention comprises certain improvements in the intake valve mechanism and also certain improvements in the means for providing for the flow of a restricted amount of liquid from the cylinder during the shock absorbing movement of the piston.

In the present embodiment of the invention a tubular piston is reciprocably mounted in the cylinder 3 and comprises a solid head 5 having a cylindrical skirt 6 which fits tightly but slidably within the cylinder. The upper end of the piston is provided with a boss 7 which is connected by a pair of links 8 to the end of an interior arm 9 of a rock shaft 10 which is journalled in the casing and the rock shaft 10 is provided with an exterior arm 11 having at its end a clamp 12 for a flexible member adapted to be connected to the other relatively movable member, such as, the axle of the vehicle. The lower end of the cylinder is provided with an intake port 13 and a suitable poppet valve is provided for permitting a free flow of the liquid from the reservoir through the intake 13 into the cylinder upon the upward movement of the piston.

In the construction illustrated an annular valve cage 14 is provided which has at its lower end a flange 15 which rests upon the lower head of the cylinder around the intake 13 and is retained in seated position by a helical spring 15$^x$, the lower end of which rests upon said flange and the upper end of which engages the under face of the piston head and tends to raise the piston and thereby to maintain taut the flexible connection from the arm 11 to the other relatively movable member. The valve cage 14 is provided with a transverse bar or spider 16 in which is rigidly mounted a vertical post 17. A disk-like valve 18, having a horizontal edge portion and a substantially vertical boss 19, is slidably mounted upon the post 17 and is held normally in seated position by a helical spring 20 which rests at its lower end upon a depressing portion of the disk-like valve 18 and at its upper end abuts against the flange 21 of a collar which is retained against upward movement upon said post 17 by a cotter pin 22.

The upper end of the valve cage is provided with a novel form of valve seat presenting a narrow and preferably a sharp annular edge 23 which engages the valve and which is adapted to prevent sticking of the valve which is likely to occur where the valve engages a flat or ground surface. This sharp valve seat desirably is formed by the junction of walls 24 and 25 which are symmetrically inclined to the vertical. It is found in practice that by this construction the sticking of the valve seat is entirely eliminated and also that the accurate closing of the valve is insured.

A further feature of the invention consists in providing a novel form of relief valve for restricting the flow of liquid from the cylinder into the reservoir, which is governed partly by the fluid when compressed by the piston upon relative movement of the casing and piston elements of the shock absorber. In the preferred construction illustrated herein the lower portion of the vertical wall of the cylinder 3 is thickened and is provided with a discharge port 26 which leads from the cylinder to the reservoir. A tubular valve 27 is telescopically mounted in this port and is provided with an enlarged annular flange 28 which rather loosely fits within a countersink or recess in the wall of the casing 3 and seats against a shoulder 29 at the bottom of said countersink or recess. This recess forms a pocket which is filled with liquid and the liquid contained and trapped therein by the annular flange 28 when the valve closes forms a cushion which prevents hammering of the valve. The tubular valve is provided with a preferably integral hollow or chambered stem 30 having at its end a smaller aperture 31. The valve stem 30 preferably is mounted in a guideway 32 in a screw threaded plug or nut 33 which is seated in the external wall of the casing and which serves to permit the introduction and removal of the valve. The guideway is of slightly greater diameter than that of the valve stem and forms a valve stem chamber in which the valve stem reciprocates. The liquid in the valve stem chamber serves as a cushion for the end of the valve stem when the valve is forced open by the pressure of the liquid in the cylinder caused by the descent of the piston to so great a distance as to cause the end of the valve stem to engage the plug. A helical spring 34 surrounding the valve stem 30 and having one end engaging the head of the plug 33 and the other end engaging the flange 28 of the tubular valve serves to hold the valve preferably lightly seated in substantially balanced condition.

The portion of the tubular valve which is located within the aperture presents a chamber which communicates with the cylinder. The wall of this chamber is provided with a series of apertures 35 forming delivery ports from said chamber and the outer wall of the tubular valve desirably is provided with an annular groove 36 communicating with the ports 35.

It will be noted that the chamber of the tubular valve communicates through the hollow stem and aperture 31 in the end thereof with the guideway and that liquid is at all times permitted to flow through the small aperture 31 into the valve stem chamber in the plug 33 and thence through the guideway into the reservoir. The liquid which is forced through the aperture 31 strikes the end wall of the guideway, which preferably is conoidal, and is deflected along the guideway outside of the valve stem into the reservoir. This deflection of the current of liquid gradually reduces its pressure and permits the liquid to flow into the reservoir noiselessly and without creating foam. The guideway which forms the valve stem chamber being slightly larger than the valve stem provides communication with the reservoir which permits a restricted flow of the liquid from the valve stem chamber into the reservoir, thus offering a resistance to the piston in response to relatively slight shocks or slight movements of the piston. The liquid which is forced through the aperature 31 builds up a pressure behind the valve stem which tends to force the valve stem toward closed position in addition to the force of the valve spring 34. Thus the action of the valve is governed partially by the fluid when compressed by the piston on relative movement of the piston and cylinder to check the circulation of the fluid which passes from the cylinder to the reservoir. By reason of this construction a slight movement of the piston will force liquid from the cylinder through the valve stem and aperture 31 and guideway into the reservoir and the resistance to the flow of the liquid through this path will be sufficient to cushion light shocks and slow movements of the piston which do not produce enough pressure to move the valve 27 against the action of its spring sufficiently to establish a flow of liquid through the ports 35 of the valve into the reservoir. The aperture 31 in the valve stem is so restricted that sudden and extended pressure exerted in the cylinder by the rapid movement of the piston will not force sufficiently liquid therethrough to immediately build up a substantially equal pressure upon the end of the valve stem within the valve chamber. There is therefore on sudden actuation of the piston increased pressure of the liquid in the cylinder acting upon the valve which is uncounterbalanced by equal pressure upon the end of the valve stem within the valve stem chamber, or in other words, the effective pressure areas of the valve is increased upon a sudden increase of pressure in the cylinder with respect to the effective pressure area of the valve at the time the flow of liquid through the aperture 31 establishes a substantially equal pressure in the valve stem chamber. This lag in transmission of pressure to the valve stem chamber permits the valve to be forced from its seat momentarily and allows a restricted flow of the liquid from the cylinder through the ports 35 of the valve into the reservoir, thus immediately relieving the pressure in the cylinder beneath the piston sufficiently to avoid suddenly arresting the piston. However, the pressure in the cylinder produced by continued movement of the piston almost immediately forces sufficient liquid through the aperture 31 in the valve stem to build up such pressure in the valve stem chamber as to force the valve toward its seat, so that the resistance to the flow of liquid through the valve ports 35 is increased in correlation to the speed of movement of the piston. Consequently, the means for imposing resistance to the relative movement of the members to which the piston and casing of the shock absorber are respectively attached is dependent in extent directly upon the speed of relative movement of said members during the effective action of the shock absorber.

By reason of the fact that the valve 27 is governed partly by the action of the fluid when compressed by the piston upon relative movement of the piston and cylinder the valve offers a resistance to the flow of the liquid from the cylinder in correlation to the movement of the piston. Thus a construction is provided which is sensitively responsive both to slight and slow movements of the piston and also to sudden and extended movements of the piston, thus enabling the instrument properly to cushion the movements of the relatively movable members under all conditions.

Figure 2:
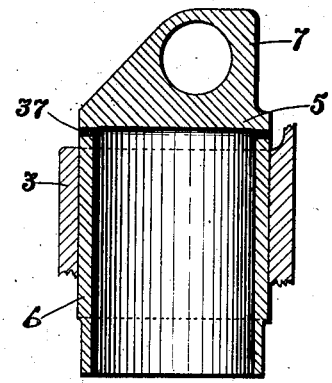
Fig. 2 is a detail vertical sectional view of a hollow piston and a portion of the cylinder in which it is reciprocably mounted, the piston being provided with vent ports adjacent the head thereof.
Figure 4:
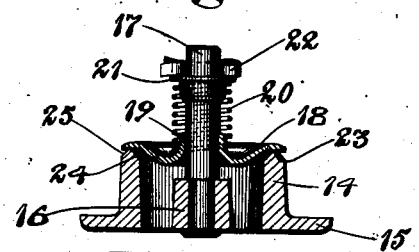
Fig. 4 is a detail view, mainly in vertical section, of a poppet valve and valve seat embodying the invention; and, Fig. 5 is a detail vertical sectional view through portions of the walls of the reservoir and cylinder, also illustrating in vertical section a novel form of relief valve.

A further feature of the invention consists in providing an air cushion between the top of the liquid in the cylinder and the under face of the piston head. In my previous application No. 518,120 the piston is shown as being provided with a vent port through which air and gases, which may be present or formed in the liquid in the cylinder, may escape. In the present construction as illustrated in Fig. 2 a plurality of such vent ports 37 are provided which are located immediately beneath the piston head and are adapted to be opened to discharge the gases into the reservoir when the piston is raised sufficiently to expose the ports above the top of the cylinder. The air or gases thus released bubble up through the liquid in the cylinder into the top of the reservoir.

Figure 3:
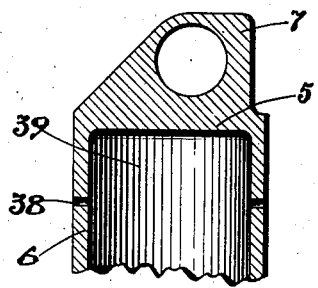
Fig. 3 is a detailed vertical sectional view of the upper portion of a hollow piston, showing the vent ports located at a distance from the head of the piston to privide an air chamber beneath the piston head.
Figure 5:
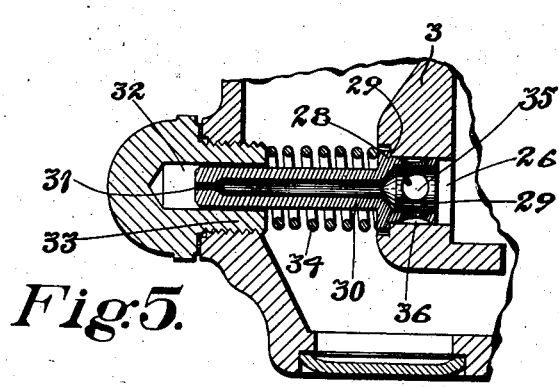

In the construction illustrated in Fig. 3 a plurality of similar vent ports 38 are provided, but these vent ports are located at a sufficient distance below the under face of the piston head to provide a trap or chamber 39 in which the air and gases within the cylinder and piston may accumulate. By virtue of this construction the air or gases which accumulate in this upper portion of the chamber act as an air cushion to absorb very slight movements of the piston particularly in warm weather where the liquid is in an extremely mobile condition. This action further adds to the sensitiveness of the instrument and, consequently, to its efficiency.

It will be understood that the embodiment of the invention disclosed herein is of an illustrative character and is not restrictive, and that various changes in form, construction and arrangement of parts may be made within the spirit and scope of the following claims.

Having thus described my invention, what I claim as new, and desire to secure by Letters Patent, is:

1. In a shock absorber comprising a liquid containing reservoir, a cylinder having a port communicating with said reservoir and a piston reciprocable in said cylinder, a valve stem chamber having a restricted communication with said reservoir, a spring actuated relief valve in said port provided with a stem reciprocably mounted in said valve stem chamber and having a relatively small aperture to permit liquid to flow gradually therethrough while seated in response to slight or slow movements of said piston, but yieldable in response to sudden or extended movements of said piston to permit a flow of liquid through said port in correlation to the movement of said piston.

2. In a shock absorber comprising a liquid containing reservoir, a cylinder having a port communicating with said reservoir and a piston reciprocable in said cylinder, a valve stem chamber having a restricted communication with said reservoir, a spring actuated relief valve telescopically mounted in said port having a chamber communicating with said cylinder and provided with a valve reciprocably mounted in said valve stem chamber and stem having a relatively small aperture therethrough communicating with the chamber in said valve and with said valve stem chamber and a lateral aperture in the wall of said valve chamber operable upon yielding of said valve upon sudden or extended movement of said piston to permit the liquid to flow through said port in correlation to the movement of the piston.

3. In a shock absorber comprising a liquid containing reservoir, a cylinder having a port communicating with said reservoir and a piston reciprocable in said cylinder, a valve stem chamber having a restricted communication with said reservoir, a spring actuated relief valve telescopically mounted in said port and having a chamber communicating with said cylinder, a flange on said relief valve engaging a seat surrounding said port, a valve stem reciprocably mounted in said valve stem chamber and having a relatively small aperture therethrough communicating with the chamber in said valve and with said valve stem chamber and a lateral aperture in the wall of said valve chamber operable upon yielding of said valve and unseating of said flange upon sudden or extended movement of said piston to permit a flow of liquid through said port in correlation to the movement of said piston.

4. In a shock absorber comprising a liquid containing reservoir, a cylinder having a port communicating with said reservoir and a piston reciprocable in said cylinder, a spring actuated relief valve telescopically mounted in said port having a chamber communicating with said cylinder, a valve stem having a relatively small aperture therethrough communicating with the chamber in said valve, a nut seated in the wall of said reservoir having a guideway for said valve stem of slightly greater diameter than said valve stem and communicating with said reservoir, and a lateral aperture in the wall of said valve chamber operable upon the yielding of said valve upon sudden or extended movement of said piston to permit a flow of liquid through said port in correlation to the movement of the piston.

5. In a shock absorber comprising a liquid containing reservoir, a cylinder, a hollow piston having a head and a downwardly extending cylindrical skirt reciprocably fitting said cylinder, an aperture in the wall of said skirt at a distance below said piston head adapted to permit air and gases to escape from said chamber, but located at a sufficient distance from said piston head to provide an air space whereby slight movements of said piston will be cushioned by the compression of air or gases trapped beneath the head of said piston.

6. In a hydraulic shock absorber comprising a reservoir, a cylinder having a piston therein, an intake port for said cylinder communicating with said reservoir, a poppet valve for said port operable upon the suction stroke of the piston to admit liquid from the reservoir into the cylinder, and a valve seat for said poppet valve presenting a sharp edge whereby sticking of the poppet valve will be prevented and accurate closing of the valve insured.

7. In a hydraulic shock absorber comprising a reservoir, a cylinder having a piston therein, an intake port for said cylinder communicating with said reservoir, a poppet valve for said port operable upon the suction stroke of the piston to admit liquid from the reservoir into the cylinder, and a valve seat for said poppet valve presenting a sharp edge formed by the junction of symmetrically inclined annular walls whereby sticking of the valve will be prevented and accurate closing of the valve insured.

8. In a hydraulic shock absorber comprising a reservoir, a cylinder having a piston therein, an intake port for said cylinder communicating with said reservoir, a poppet valve for said port operable upon the suction stroke of the piston to admit liquid from the reservoir into the cylinder, and a valve seat for said poppet valve produced by converging surfaces presenting a narrow annular edge to engage the valve whereby sticking of the valve will be prevented.

In testimony whereof, I have signed my name to this specification.

RALPH M. LOVEJOY.